(12) United States Patent
Babale et al.

(10) Patent No.: US 9,215,368 B2
(45) Date of Patent: Dec. 15, 2015

(54) VIRTUAL DECALS FOR PRECISION ALIGNMENT AND STABILIZATION OF MOTION GRAPHICS ON MOBILE VIDEO

(71) Applicants: Bachir Babale, Yokohama (JP); Michael Benjamin Karp, Seattle, WA (US)

(72) Inventors: Bachir Babale, Yokohama (JP); Michael Benjamin Karp, Seattle, WA (US)

( * ) Notice: Subject to any disclaimer, the term of this patent is extended or adjusted under 35 U.S.C. 154(b) by 120 days.

(21) Appl. No.: 14/094,423

(22) Filed: Dec. 2, 2013

(65) Prior Publication Data
US 2014/0160320 A1    Jun. 12, 2014

Related U.S. Application Data

(60) Provisional application No. 61/732,392, filed on Dec. 2, 2012.

(51) Int. Cl.
*H04N 5/232* (2006.01)
*H04N 5/262* (2006.01)

(52) U.S. Cl.
CPC ....... *H04N 5/23229* (2013.01); *H04N 5/23293* (2013.01); *H04N 5/2621* (2013.01)

(58) Field of Classification Search
CPC ...................... H04N 5/272; H04N 2201/3245
See application file for complete search history.

(56) References Cited

U.S. PATENT DOCUMENTS

| 8,547,401 B2 * | 10/2013 | Mallinson et al. | 345/633 |
| 8,957,910 B2 * | 2/2015 | Ito et al. | 345/619 |
| 8,963,955 B2 * | 2/2015 | Noge | 345/633 |
| 2006/0038833 A1 * | 2/2006 | Mallinson et al. | 345/633 |
| 2009/0322671 A1 * | 12/2009 | Scott et al. | 345/156 |
| 2010/0045701 A1 * | 2/2010 | Scott et al. | 345/633 |
| 2010/0045869 A1 * | 2/2010 | Baseley et al. | 348/598 |
| 2012/0106933 A1 | 5/2012 | Ralston et al. | |
| 2012/0133676 A1 * | 5/2012 | Kitahara | 345/633 |
| 2012/0165099 A1 * | 6/2012 | Ito et al. | 463/37 |
| 2013/0222647 A1 * | 8/2013 | Ishihara et al. | 348/239 |
| 2014/0111543 A1 * | 4/2014 | Kim | 345/633 |
| 2014/0180972 A1 * | 6/2014 | Boldyrev et al. | 706/12 |
| 2014/0357366 A1 * | 12/2014 | Koganezawa et al. | 463/31 |
| 2014/0368534 A1 * | 12/2014 | Salter et al. | 345/619 |
| 2015/0040074 A1 * | 2/2015 | Hofmann et al. | 715/852 |

* cited by examiner

*Primary Examiner* — Roberto Velez
*Assistant Examiner* — Cynthia Segura
(74) *Attorney, Agent, or Firm* — John W. Branch; Lowe Graham Jones PLLC

(57) ABSTRACT

The virtual decals for precision alignment of motion graphics of the present invention provides a method by which a person using a mobile video capturing device may apply a special effect or motion graphic to the video being captured using a virtual decal present on the screen of the mobile device, providing a reference to the user allowing the user to compensate for camera movement and properly frame the video to which the motion graphic will be applied using post-processing. The present invention further provides a method for measuring the optic flow of a given video scene and applying that data in a predictive manner so as to stabilize a motion graphic against the scene. Post processing places such a motion graphic within the processed video in such a way that it appears to be part of the original scene.

24 Claims, 13 Drawing Sheets

VIRTUAL DECALS FOR PRECISION ALIGNMENT AND STABILIZATION OF MOTION GRAPHICS ON MOBILE VIDEO

CROSS-REFERENCE TO RELATED APPLICATION(S)

This application is a Utility patent application based on a previously filed U.S. Provisional Patent application, U.S. Ser. No. 61/732,392 filed on Dec. 2, 2012, the benefit of the filing date of which is hereby claimed under 35 U.S.C. §119(e) and incorporated herein by reference.

TECHNICAL FIELD

The present invention relates generally to video recording and processing, and more particularly, but not exclusively to the video recording and processing on mobile computers.

BACKGROUND OF THE INVENTION

The movie making industry has captivated the masses since the advent of the motion picture camera. The process of film making is constantly changing and evolving as technology continues to advance. With the advent of smart phones and charge-coupled device ("CCD") image capturing technology, people are now able to create videos in any desired location and time using their mobile phones and other mobile electronic devices.

Standard mobile phones or smartphones generally have the ability to capture photos and videos, and often the ability to capture both simultaneously. Most recently, smartphones have begun offering applications or "apps" that further provide the ability to edit video on the phone itself, without the aid of a personal computer. However, there are no systems currently available allowing a user to select an effect or motion graphic before actually filming a scene and apply it in such a way that allows the user to properly frame the scene on the mobile device with a graphical representation of the effect or graphic.

Additionally, most video post-processing is conducted on highly capable personal computers, and most often large desktop machines with powerful processors. Little has been done to allow effects to be added to video captured with a mobile device, right on that mobile device. Where a motion graphic or effect is applied to a scene, it most often moves with the camera frame, as if it were fixed to the outside of the lens and located in a specific location in the video image. The graphic then moves where the camera "eye" moves, not fixed to the scene itself.

In light of the above, it would be advantageous to provide a method by which a user can select from a library of video effects within a video capturing app on a mobile device, allowing the user to embed a resulting motion graphic into a video without the use of a separate computer for video post-processing.

It would be further advantageous to provide a system that allows a user to apply a motion graphic to a video captured on a mobile device, applying a predictive algorithm to fix the graphic or effect against the scene, maintaining its position in the scene, as opposed to allowing the graphic to move with the camera eye as it moves across the scene.

SUMMARY OF THE INVENTION

The present invention presents a method by which a user can create an augmented video scene with embedded computer graphics and animation in mobile video capture through video post-processing.

The present invention provides the user with expanded information for flexibility in video creation and editing by allowing the user capturing video with a smartphone or similar mobile device to superimpose or embed graphics into the video. The chosen graphics are represented as a "decal" on the user display screen, or camera viewfinder, of the mobile device while taking the video that is further movable within the confines of the video. This virtual decal provides an image overlay demonstrating where the graphics will occur on the processed video. This allows the user to frame the video by placing the chosen decal in the desired location on the user display screen while filming.

Once the video is captured and stored in local media, post-processing embeds a motion graphic within the video, in the location indicated by the position of the decal.

For instance, if a user wanted to embed a logo, copyright notification, animation, or some other image ("motion graphic") within a video he or she was shooting with a mobile device, the user would select the motion graphic with a corresponding "decal" prior to shooting. During the shooting process, the decal appears in the user display screen of the camera viewer, indicating the location where the final motion graphic will appear in the processed video. When shooting is complete, post-processing embeds the motion graphic (represented by the decal) into the video, as if the decal were actually filmed in the video.

Additional embodiments of the present invention include the ability to include dynamic or animated virtual decals allowing a full effect sequence. In such an embodiment, the embedded motion graphics on the mobile device's video remain stationary in circumstances in which the source video incorporates movement of the camera.

The user selects a desired motion graphic at which point the corresponding virtual decal appears in a specific location in the camera viewfinder. The user is then able to identify the ultimate position of the motion graphic in the final processed video by the placement of the virtual decal in the viewfinder, while recording the video. The motion graphic remains in a stable position within the video, despite any movements of the camera during the recording process. The invention utilizes principles of "optic flow," compensating for camera motion or panning, in order to preserve the position of the motion graphic relative to the motion in the video image. Once the user completes shooting, post-processing embeds the motion graphic associated with the virtual decal in use within the final video, maintaining the motion graphic's position relative to the video subject as the camera moves. The result is a video with a motion graphic that remains stationary within the dynamic space of the video, enabling the illusion of realism.

For instance, such an embodiment allows the user to embed a dynamic computer generated animation, such as a fire or moving character, into the video. While the user may pan left, right, up, or down with the camera, the position of the animation or graphic represented by the virtual decal is preserved within the resulting video.

This further allows for the insertion of branded objects into effect sequences creating advertising opportunities within user-generated mobile video.

DESCRIPTION OF THE DRAWINGS

Non-limiting and non-exhaustive embodiments herein are described with reference to the following drawings. In the drawings, like reference numerals refer to like parts throughout the various figures unless otherwise specified.

DETAILED DESCRIPTION

Figure 1:
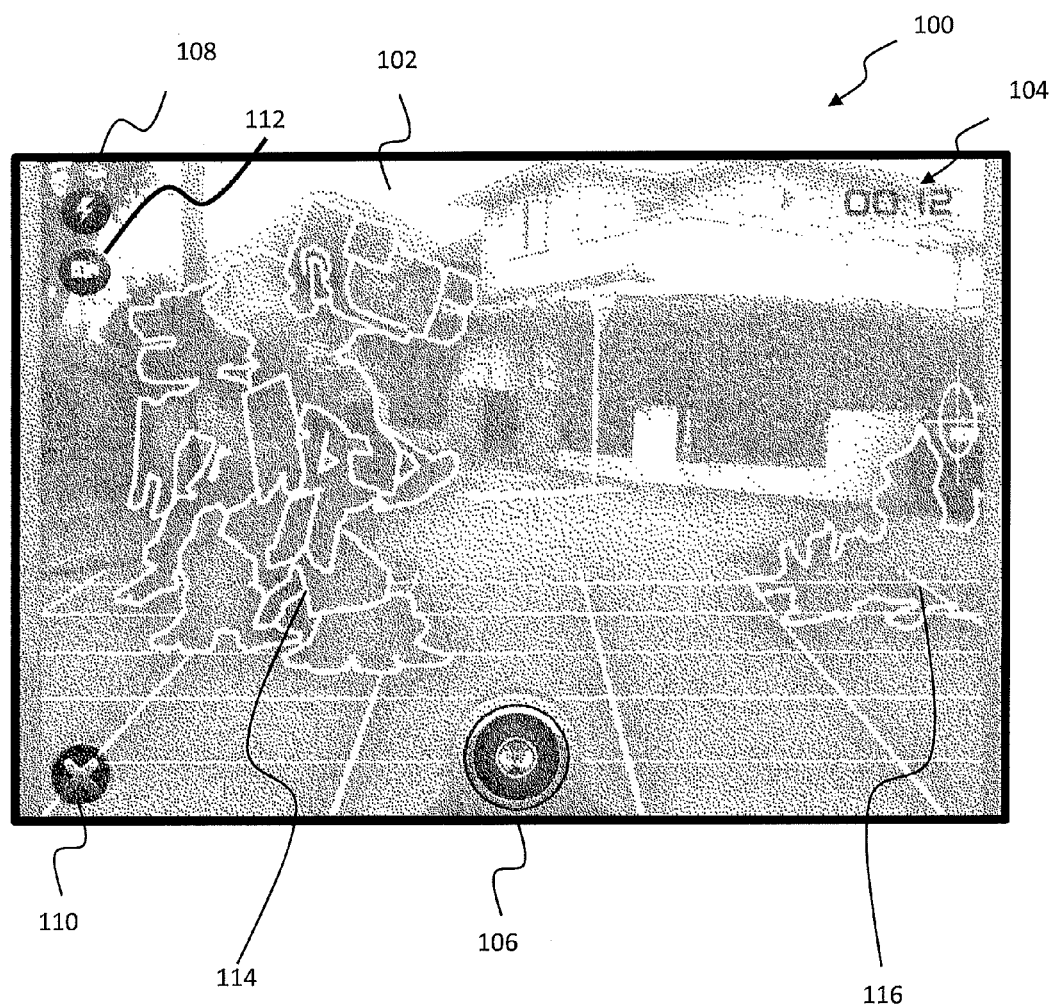
FIG. 1 is a frame capture from a video-capture app utilizing a preferred embodiment of the present invention, showing user-selectable virtual decals, mobile video, and options controls.

Various embodiments now will be described more fully hereinafter with reference to the accompanying drawings, which form a part hereof, and which show, by way of illustration, specific embodiments by which the invention may be practiced. The embodiments may, however, be embodied in many different forms and should not be construed as limited to the embodiments set forth herein; rather, these embodiments are provided so that this disclosure will be thorough and complete, and will fully convey the scope of the embodiments to those skilled in the art. Among other things, the various embodiments may be methods, systems, media, or devices. Accordingly, the various embodiments may take the form of an entirely hardware embodiment, an entirely software embodiment, or an embodiment combining software and hardware aspects. The following detailed description is, therefore, not to be taken in a limiting sense.

Throughout the specification and claims, the following terms take the meanings explicitly associated herein, unless the context clearly dictates otherwise. The term "herein" refers to the specification, claims, and drawings associated with the current application. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used herein the term "motion graphic" may refer to a specific video animation and/or special effect graphic selectable from the motion graphic and/or special effect library. A motion graphic may comprise various images, computer-generated graphics, animations, or the like, that can be embedded in a video.

As used herein the term "virtual decal" may refer to an image overlay demonstrating where the motion graphics will appear on the processed video. During the video capture process, the virtual decal may appear in the user display screen and/or view finder of a mobile computer and/or camera viewer, indicating the location where the motion graphic will appear in the processed video.

As used herein the term "tracking points" may refer to several points determined within a video frame that may be identified from one video frame to the next in a sequence of captured video frame. Sufficient number of points may be identified to enable tracking the location of the tracking points between video frames. In some embodiments, a configuration setting may be used for setting the minimum and/or maximum range of the number points to be determined.

As used herein the term "reference point" may refer to one or more points or positions within a video frame that may be determined from the tracking points. Reference points may be employed for determining the precise location within each video frame to use for locating and embedding the motion graphic. As tracking points change position from video frame to frame to video the reference points for a video frame may be updated accordingly. Thus, as the reference point changes location in a video frame, the location of where the motion graphic is embedded within the video frame may be modified based in part on the change of position of the reference point.

As used herein the term "video scene" may refer to an area viewable in a video recording view finder or it may refer to a recorded video of a scene. Video scenes may include image data captured from an area of view that exceeds the dimension of a single video frame or the area that is viewable at a given time in the video recorder's view finder. In some cases video scenes may have a definite start time and stop time, or otherwise have a set duration based on the amount of video that has been recorded. Virtual decals may be overlaid on a view finder during the recording of a video scene. Likewise, motion graphics may be embedded into a video scene after it has been recorded.

As used herein the term "video frame" may refer to captured image data representing a single image from a sequence of images captured as part of recording a video scene. In some embodiments there may be 12, 24, 30, 60, or more, video frames per second of recorded video depending on the capability of the video recorder and/or configuration setting used when recoding the video.

As used herein the term "quality score" may refer to numeric value that is assigned to each tracking point. The quality score may be employed to determine if an individual tracking point should be kept or discarded. For example, in at least one of the various embodiments, a quality score may be computed based on information that includes determining if the motion of the tracking point is deviating from its predicted location.

Referring initially to FIG. 1, a screen capture of a mobile device video capture application ("app") is generally labeled 100. Screen capture 100 comes from a video sequence 102 of a parking lot, 12 seconds into the video, as depicted by time stamp 104.

Also shown on the screen capture 100 of the app are a record button 106, a flash button 108, cancel button 110, mode selector 112, along with motion decals 114 and 116, both depicted as outlines on the screen capture 100.

The user will initiate a video processing application, such as, video processing application 678 and/or image tracking application 682 on a mobile device (e.g., a mobile computer) and select the motion graphic for inserting into the video. Once the motion graphic is selected the user is presented with a camera viewfinder 100, which includes the virtual decals 114 and 116 of the corresponding motion graphic. The user may choose to turn the decals 114 and 116 on or off with mode selector 112. The decals may be static or animated depending on the motion graphic selected. Cancel button 110 closes the viewfinder and returns the user to a library of alternative motion graphics. Record button 106 commences video capture by the mobile device. Time stamp 104 can indicate one of a number of possible events, such as the time remaining in a given animated motion graphic's animated sequence, or the elapsed time recorded, providing the user with an indication of when the effect is complete and recording can cease. In an embodiment, options are available allowing the user to display multiple time stamps at once.

In a preferred embodiment, video sequence 102 is has a stationary camera position, viewing a single scene from a static angle. Virtual decals 114 and 116 are associated with a specific motion graphic selectable from the effect library (not shown). The effect library is contains the images, computer-generated graphics, and animations that can be embedded in the video. The selected effect is ultimately incorporated into a given video sequence 102 as a motion graphic. Once the user selects an effect from the library, a virtual decal is available for display in the camera viewfinder 100, indicating the ultimate position of the motion graphic that will be embedded within the video sequence 102.

In at least one of the various embodiments, virtual decals are represented as static line drawings of the desired effect, reducing the amount of processing power required to represent them during video capture. In an alternative embodiment, virtual decals may be represented on screen as fully animated versions of the resulting motion graphic, providing the user with a more accurate depiction of how the motion graphic will appear within the resulting video scene.

Further, in at least one of the various embodiments, video processing application 678 may be arranged to enable the user to adjust the size and/or scale of the virtual decal, which may determine the size and/or scale of the how the motion graphic may be rendered into the final video scene. In at least one of the various embodiments, a touch screen interface may enable the user to adjust the position, size, orientation, or the like, or combination thereof, of the virtual decal directly in the mobile computer's view finder. The user may then begin recording a desired video scene by activating record button 106, framing the video scene with respect to static virtual decals 114 and 116, each embodying a component of the motion graphic effect. While virtual decals 114 and 116 are not incorporated into the video sequence 102 while recording, both virtual decals 114 and 116 provide the user with a reference as to where the resulting motion graphic will be embedded once video sequence 102 is recorded and processed.

In a preferred embodiment, virtual decals 114 and 116 need not be a single image, but can be a computer-generated animation or graphical sequence. Both virtual decals 114 and 116 can thereby move within the video sequence 102 as dictated by the computer-generated animation or graphical sequence, allowing the user to adjust the camera angle as required.

For instance, as screen capture 100 shows, video sequence 102 contains virtual decal 114, depicted as a robot figure with a gun and decal 116 is depicted as a crosshair and explosion where the robot is aiming. Both virtual decals 114 and 116 remain referenced to a single spot within the video sequence 102, and reflect moments in the motion graphic for the user to obtain perspective while recording video sequence 102.

In an embodiment, virtual decals 114 and 116 may be depicted as series of images as in an animation, such as a robot walking across the screen creating an explosion, further aided by a graphical vector line (not shown) describing the path of the animation across the screen for the user's reference.

Figure 2:
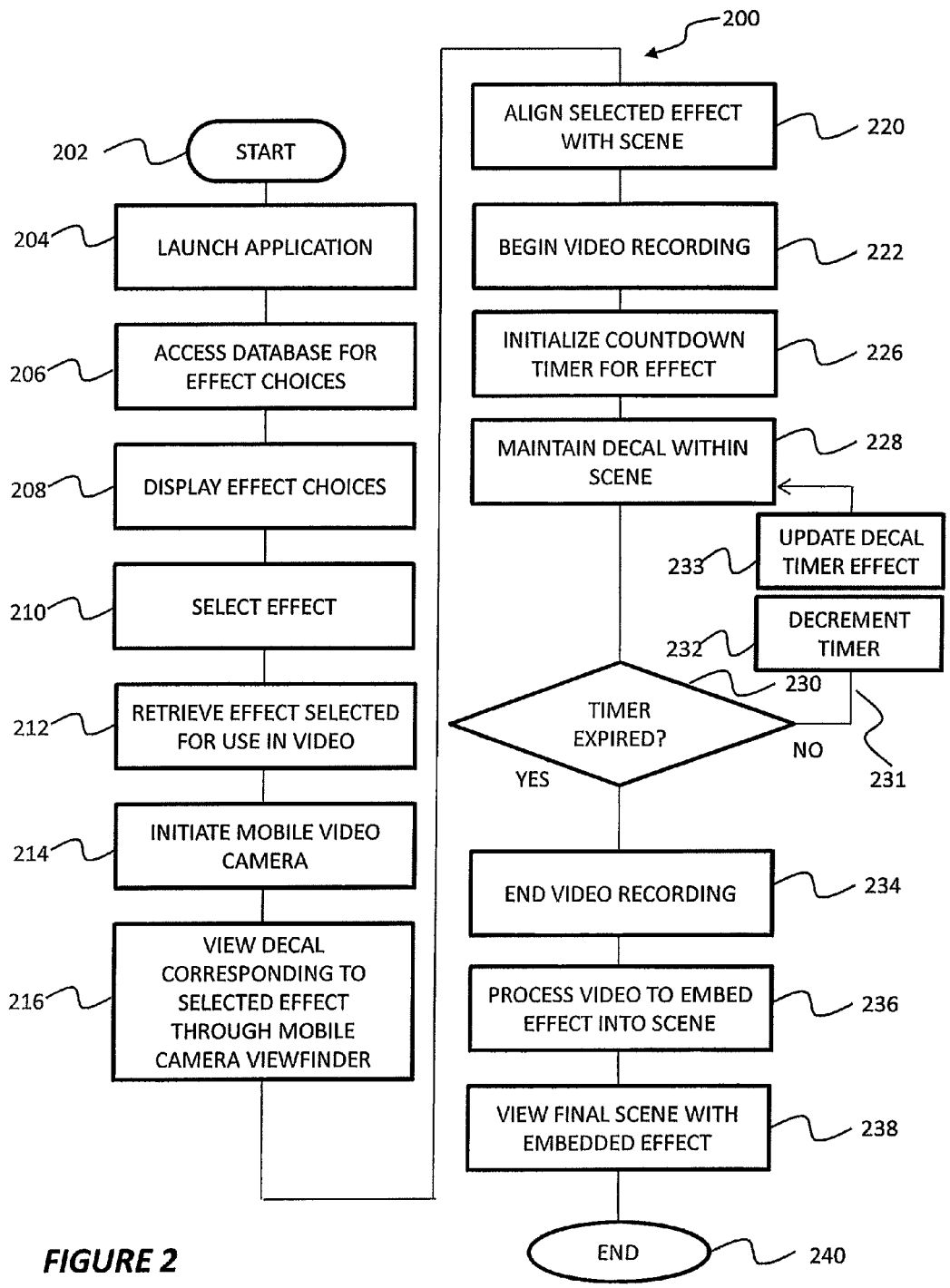
FIG. 2 is a flow chart of a preferred embodiment of the present invention showing the step-by-step process in which a mobile application using virtual decals for precision alignment of motion graphics is initiated and implemented by the user, as the user selects the desired effect from an effect database, initiates video capture with a mobile device, frames the video using the location of the virtual decal in the camera viewfinder, records a video, processes the video, and ultimately views the final video scene with the selected effect embedded within the video.
Figure 3:
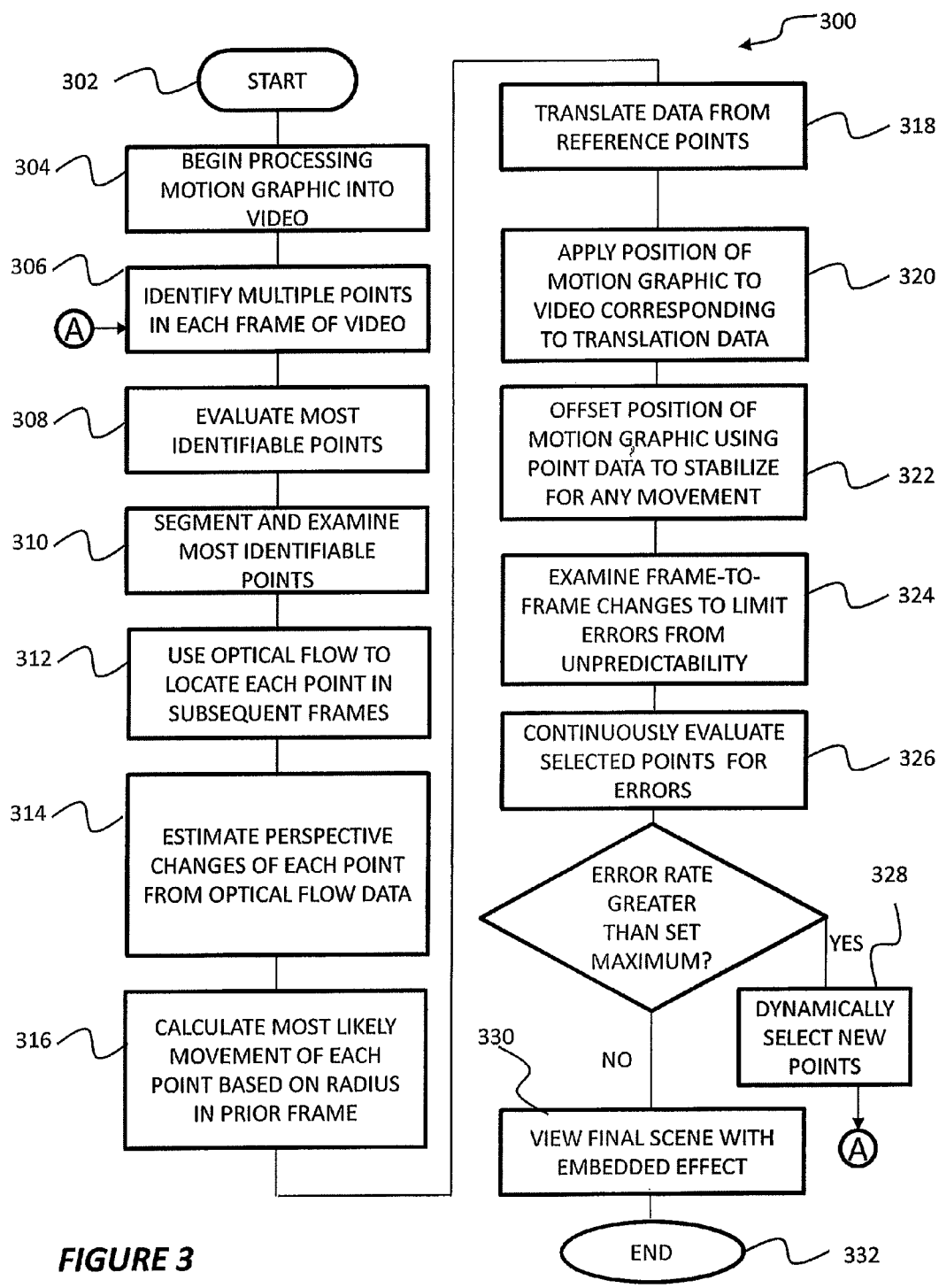
FIG. 3 is a flow chart of an alternative preferred embodiment of the present invention showing the process by which a computer-generated motion graphic is fixed in space within a mobile video by processing the video for recognizable and repeatable points within each frame, using optical flow allowing the process to locate each point in subsequent frame, predicting perspective changes of the inserted graphic, calculating movement of each point based on the radius of prior frames, translating the motion of the points into data, applying the motion graphic to the video based on the translation data, offsetting the position of the motion graphic to the video for image stabilization, examining frame-to-frame changes for error limitation, continuously evaluating and correcting for video errors, ultimately resulting in a video with an embedded motion graphic that maintains its position in the video regardless of camera motion.

FIGS. 2 and 3 use flow charts to illustrate the general operations that may be performed by at least one of the various embodiments, including by video processing application 678 and image tracking application 682. In at least one of the various embodiments, processes 200, and 300 described in conjunction with FIGS. 2 and 3 may be implemented by and/or executed on a single mobile computer, such as mobile computer 650 of FIG. 6. However, embodiments are not so limited and various combinations of mobile computer, network computers, desktop computers, video camera, or the like may be utilized.

Referring now to FIG. 2, a block diagram of a preferred embodiment of the present invention is depicted and generally labeled process 200. The user will start at step 202 with the initiation of a particular mobile video capture device. At step 204, the user will launch a given application that makes use of the virtual decals for precision alignment of motion graphics of the present invention, and access the effect database at step 206. In step 208, the mobile device will display available effects, allowing the user to select, in step 210, a desired motion graphic that will then be represented onscreen as a static or dynamic virtual decal 114 and 116. In step 210, the library of effects can be displayed on the mobile device in such a manner as to depict the associated motion graphic as it would appear in a completed video, allowing the user to make an informed decision as to how to frame a given video sequence 102.

In an alternative embodiment, through the use of options button 108, the user will also be able to view the effect library in a manner that shows virtual decals 114 and 116 as they would appear as motion graphics in the video capture (step 222, below). Once selected, the user may also adjust the size of a given effect or virtual decal affecting the ultimate size of the motion graphic in the resulting video sequence 102. In step 212, the process will retrieve the effect selected by the user in step 210, allowing the user to view the selected virtual decals 114 and 116 in a video capture. User may activate or deactivate selected virtual decals from view with mode selector button 112. Step 214 initiates a given mobile capture device, such as the embedded CCD camera in a common smartphone. It is to be appreciated by those skilled in the art that the use of a smartphone in the present example is not to be considered limiting. The use of other mobile devices such as a tablet personal computer ("tablet PC") or other mobile video capture device do not depart from the spirit of the invention.

In step 216, a virtual decal, such as a static virtual decal 114 or a dynamic virtual decal 116, corresponding to the effect choice is viewable within the viewfinder of the camera and video capture app on the user's mobile device. The user may then size and position the virtual decal within the frame of the video capture device in order to align it with the desired subject, as stated in step 220. In step 222, the user begins recording a desired video sequence 102, while remaining able to position the virtual decal in the field of view as required.

Method steps 226 through 230 are related to a visual timing cue that may provide a user with feedback regarding the minimum video duration required for a particular video graphic, and will be discussed further in conjunction with FIGS. 8 and 8 A-C.

In an embodiment, the user may select a virtual decal 114 in order to place a cartoon image or other graphic sequence or animation in the frame, as shown in FIG. 1. Alternatively, in the case of an advertisement or copyright notice, the resulting motion graphic will be displayed in a in a position within the field of view of the frame, independent of the camera's angle. Step 228 in process 200 is the system function that maintains the position of the virtual decal 114 or 116 in the user-selected position as the user captures desired footage. This step 228 ensures that the reference for the virtual decal 114 or 116 is maintained throughout filming.

Once the video capture is complete, the user may end recording with his mobile video capture device in step 234, and proceed to step 236, in which the mobile device's video editing application will process the video to embed the motion graphic represented by the virtual decal (e.g., virtual decals 114 and 116) at the appropriate position in the appropriate frames of the video sequence 102. Then the user may be enabled to view the resulting video sequence 102 with embedded graphics or animations in a final video scene in step 238. Once the process has ended in step 240, the user may then further edit or share the post-processed video containing the video-graphic as desired.

Accordingly, in at least one of the various embodiments, the same mobile device that captures the video may be the same mobile device that performs the image processing for tracking the graphic location and embedding the graphic into the recorded video.

Referring now to FIG. 3, an alternative preferred embodiment of the present invention is depicted as a flow chart, generally referred to as process 300. In at least one of the various embodiments, process 300 may also be understood as an expansion of step 236, picking up the process in the video processing stage, following video capture and allows the application of video motion tracking to mobile video.

Whereas process 200 provides a system for the user to place virtual decal 114 or 116 in a position providing a reference for where the motion graphic will ultimately lie in the final video, process 300 provides a method by which the motion graphic is referenced to the subject of the video and maintains its position relative to the subject of the video as the camera moves, pans, or tilts.

Process 300 starts 302 with step 304, wherein the motion graphic associated with the virtual decal 114 or 116 chosen from the effect library in step 210 may be processed into individual frames of mobile video feeds at any frame rate or resolution to account for variance between mobile device capabilities. In at least one of the various embodiments, process 300 may be arranged to process each frame of video sequentially.

Within each video frame, process 300 identifies several points on each frame that can be recognized as varying from one frame to the next based on a number of properties including contrast, lighting, shape, shadow, size, etc. These tracking points are, more particularly, specific pixels or areas of pixels within the image of each frame. Each of these tracking points within each video frame is referenced to the adjacent frames and used to track the motion of the camera. Also, points on each frame may be utilized to determine the optic flow of the image as the camera is panned or moved.

Step 306 multiplies the process in step 304, as the system of process 300 selects between forty and eighty points per frame that may be the most effectively identified from one video frame to the next. In at least one of the various embodiments, more or less points per frame may be determined such that a sufficient number of points may be identified to enable tracking between frames. In some embodiments, a configuration setting may be used for setting the minimum and/or maximum range of the number points to be determined. These points may be referred to as tracking points.

In at least one of the various embodiments, the determined tracking points may be employed to establish one or more reference points that may be used for determining the precise location to use for locating and embedding the motion graphic within each video frame. If the reference point changes locations in subsequent video frames the location of the motion graphic may be offset accordingly. For example, in at least one of the various embodiments, assuming a motion graphic that is located at (100, 100) in a coordinate system and the reference point based on the tracking points is at (200, 100), if inter-frame camera shake moves the reference point to (205, 100), the motion graphic location may be offset to (105,100) to account for the motion contributed by the camera shake. This compensation makes the motion graphic appear to be stationary with the video image even though the camera may have moved. Likewise, the motion graphic location may be offset to account for changes in the reference point location based on deliberate camera movements, such as panning, zooming, tilting, or the like.

In at least one of the various embodiments, a tracking point may be determined based on computing a score based on a combination of different factors, such as, contrast, brightness, darkness, pattern matching, edge detection, corner-recognition, or the like. In at least one of the various embodiments, one or more of the factors may be weighted based on their strength of the correlation with identifying quality points suitable for tracking between frames. In at least one of the various embodiments, the weighting values may be determined and/or modified using configuration settings. In a preferred embodiment, this process is adaptive over time and depends on the composition of the video, or more specifically contrast features, shapes, or even colors. In an alternative embodiment, user-selectable options allow the user to adjust the number of enabled reference points and where they are positioned.

In at least one of the various embodiments, video frames may be analyzed to determine one or more characteristics of the video, such as, brightness, contrasts, motion, colors, indoors, outdoors, or the like. The factors used for determining the tracking points may be modified based on one or more of these characteristics. For example, in at least one of the various embodiments, in low contrast video, edge detection may be difficult and/or unreliable while point brightness may be reliable. Accordingly, in this example, the weight value for brightness values may be increased while the weight value for edges detection may be reduced.

In at least one of the various embodiments, one or more formulas may be employed for computer score for points and/or areas of points that may be included in a video frame, including:

$$f(A) = \sum_{p \in A} e^{-\left(\frac{I(p)-I(p_0)}{t}\right)^q}$$

Where, in at least one of the various embodiments, the function $f$ determines the quality score of an area A centered around a point p0, where I represents the intensity of a point p, and t and q are determined empirically. Here, t and q may be weighting factors that correspond to basing at least a portion of the quality score of the illumination factor of the pixels that correspond to each point. In at least one of the various embodiments, other factors may be included, and/or substituted as well, including, contrast, brightness, darkness, pattern matching, edge detection, corner-recognition, or the like.

Step 308 determines the points for enabling the system to later identify motion and/or scene changes between the images from frame to frame of the video in step 310. For example, this step 308 can select high-contrast areas in individual video frames or sharp edges and shapes in the features of the captured video, as tracking points. In at least one of the various embodiments, the tracking points may be identified based on quality scores computed based on the pixels in the frame that are associated with the points.

Step 310 then tracks the most identifiable spatially distributed tracking points (from step 308) from frame to frame and compares their position. As the tracking points vary from frame to frame, step 312 examines the optical flow of individual tracking points. Optical flow in this sense refers to the pattern of apparent motion of objects, surfaces, and edges in a visual scene caused by the relative motion between an observer and the scene. In step 312 this refers specifically to the relative motion of the scene being filmed and the mobile video capture device, as well as the scene's directional movement, rotation, zoom, and any other warping of the scene as viewed by the camera.

The data determined in step 312, may be compared from frame to frame and the differences in the position of the individual tracking points may be used in a predictive manner in step 314 to estimate perspective and position changes in the position of the tracking points from frame to frame.

Step 316 calculates the most likely movement of each tracking point based on the radius of travel from the prior frame or frames. This process reduces the likelihood of statistical error and resulting video error. In at least one of the various embodiments, this may enable tracking points that may be moving and/or accelerating inconsistently as compared with other tracking points to be determined and discarded from the set of tracking points. For example, in at least one of the various embodiments, if a first portion of the tracking points correspond to a building or other fixed structure in the view field, and a second portion of the tracking points correspond to a stationary automobile each portion of tracking points should remain within an expected radius in subsequent video frames. However, in this example, if the automobile begins to drive away, in subsequent video frames, the tracking points corresponding to the automobile will be begin to move beyond the radius defined for their expected location.

In at least one of the various embodiments, a quality score for each tracking point may be modified based on the variance of the predicted location of the tracking point within the video frame and the actual position. For example, if a tracking point determined in a first video frame is located close to a predicted location in a subsequent video frame, the quality score for that point may be determined to be higher than if the tracking point in the subsequent video had drifted to an unexpected location. Note, the tracking point may be expected to drift in accordance with the determined optical flow for the video scene. Deviating away from an expected location in the video frame reduces the quality score of the tracking point because its location is not reliably predicted.

Step 318 translates the data from step 316, enabling application of the data to adjust the position of the motion graphic selected by the user. In a preferred embodiment, the location of the effect, or motion graphic within the resulting video may be annotated by the use of a virtual decal 114 or 116, as in process 200; however, a virtual decal 114 or 116 is not required to affect process 300. In step 320, the selected motion graphic is applied to the video frames, either individually, or in bulk, depending on the frame rate of the captured video and the rate of change of motion graphic. The position of the motion graphic will be predicated on whether it is a single graphic or a group or sequence of computer-generated images or animations.

Once the motion graphic is applied to the individual video frames, the position of the motion graphic is adjusted for optic flow, in step 322. The data generated in step 316 and translated in 318 is processed and inversely applied to the position of the motion graphic to proportionately offset aspect or position shifts between video frames, stabilizing the graphic against any movement between frames of the video. This maintains a "fixed" position of the motion graphic in the resulting video, as if the motion graphic was actually part of the original scene.

In at least one of the various embodiments, the position of the tracking points may be used to translate the position of the graphic to compensate for translation (motion) accountable to the motion of the camera.

Step 324 utilizes an algorithm to analyze the movement of tracking points from one frame to the next, and calculates the likely future location of each tracking point within each video frame. In at least one of the various embodiments, one or more well-known image processing algorithms may be employed as part of determining optical flow and motion data. In at least one of the various embodiments, one or more well-known gradient based algorithms, such as, least-squares, least median of square error, or the like, may be employed to determine optic flow and/or motion data for the video frame. Likewise, in at least one of the various embodiments, one or more well known statistical based algorithms, such as, RANSAC (RANdom SAmple Consensus), or the like, may be employed. One of ordinary skill in the art will appreciate that other algorithms for determining optic flow and/or motion data for video frames may be used without departing from the scope of the innovations disclosed herein. In at least one of the various embodiments, information provided from one or more motion sensors such as those described in conjunction with FIG. 3 (e.g., gyroscopes, accelerometers, or the like) may be used if determining optical flow and/or motion data. The information from the physical sensors on the mobile computer may be employed to determine motion/movement in the video frames that may have been introduced by movement of the mobile computer employed to record to the video frames. In at least one of the various embodiments, some or all of the motion sensor information may be used to confirm and/or correct the prediction computations used for determining optical flow and/or motion data for a video frame.

If the determined movement of a tracking point significantly differs from its predicted movement and/or the motion data for that point starts to significantly diverge from the optic flow and/or motion data in the scene, the system may determine a disruptive event has occurred. For example, determined tracking points may be associated with objects in the scene that begin to move independent of camera movement. As these objects move within the scene, the associated tracking point locations will begin to diverge from their expected path and/or location. Step 326 provides for continuous evaluation of the selected tracking points for calculation errors, providing real-time error notification and correction. If the preset maximum error rate is exceeded, step 328 will loop back to step 306 (indicated by connector A), wherein the process 300 may dynamically determine new tracking points for calculation of the optic flow for referencing the motion graphic with the camera motion. If tracking points are determined to be varying and/or changing beyond the system's capacity to continue using them for tracking they may be discarded and new tracking points may be determined. In at least one of the various embodiments, the new tracking points may be determined such that they may have similar characteristics to the tracking points that were discarded to preserve the integrity of the tracking. In an embodiment, error rates and/or variance thresholds are fixed within the code of the program, however in alternative embodiments, error rates and/or variance thresholds may be adaptive or user-selectable in a given application, using direct user inputs and/or configuration settings.

In at least one of the various embodiments, each tracking point may be evaluated for quality. In at least one of the various embodiments, quality may be based on the age of the tracking point and the variance between its predicted location and its actual location. In at least one of the various embodiments, the age of a tracking point may be computed based on the number of video frames that have been processed since the tracking point was first identified as a tracking point.

In at least one of the various embodiments, if the quality score for a tracking point drops below a defined threshold, the tracking point may be discarded from the set of tracking points. Accordingly, in at least one of the various embodiments, if the number of current tracking points drops below a defined threshold, the process may loop back to step 306 to determine additional tracking points.

In at least one of the various embodiments, in cases where the number of tracking points drops below the defined threshold, the remaining tracking points may have high quality values. Accordingly, such tracking points may be automatically included in the set of "new" tracking points. For example, if 15 is defined as the minimum number of tracking points, process 300 may proceed to step 306 to acquire more tracking points when the number tracking points drops below 15. However, for this example, the remaining tracking points may be automatically included in the new set of tracking points rather than being discarded.

Alternatively, if the error rate is not exceeded in step 328, step 330 allows the user to view the final video scene with the embedded motion graphic that is positioned in the video frame based on reference information derived from the tracking points.

In at least one of the various embodiments, process 300 may be arranged to maintain at least two Cartesian coordinate systems. One coordinate system, the motion coordinate system, may represent an area larger than the video frame and another coordinate system, the frame coordinate system may represent the actual area of the video frame.

In at least one of the various embodiments, the motion coordinate system may be used for tracking the location of motion graphic during processing. Since the motion coordinate system may cover more area than the frame coordinate system, the process may be enabled to track the location of the motion graphic even if it is out of the viewing area of the video frame (e.g., not visible in the video frame. For example, if the motion graphic comprises a flying saucer, flying into the on screen view of the scene from the left and exiting to the right of the scene, the motion coordinate system may be used to track the location of the flying saucer motion graphic while it is out of view (out of frame). Accordingly, in at least one of the various embodiments, process 300 may be arranged to translate the location of the motion graphic from the motion coordinate system to the frame coordinate system. See, FIG. 11.

After the end of this process 300, at step 332, the user may then further process the resulting video or share it at will.

Illustrative Embodiments

Figure 4:
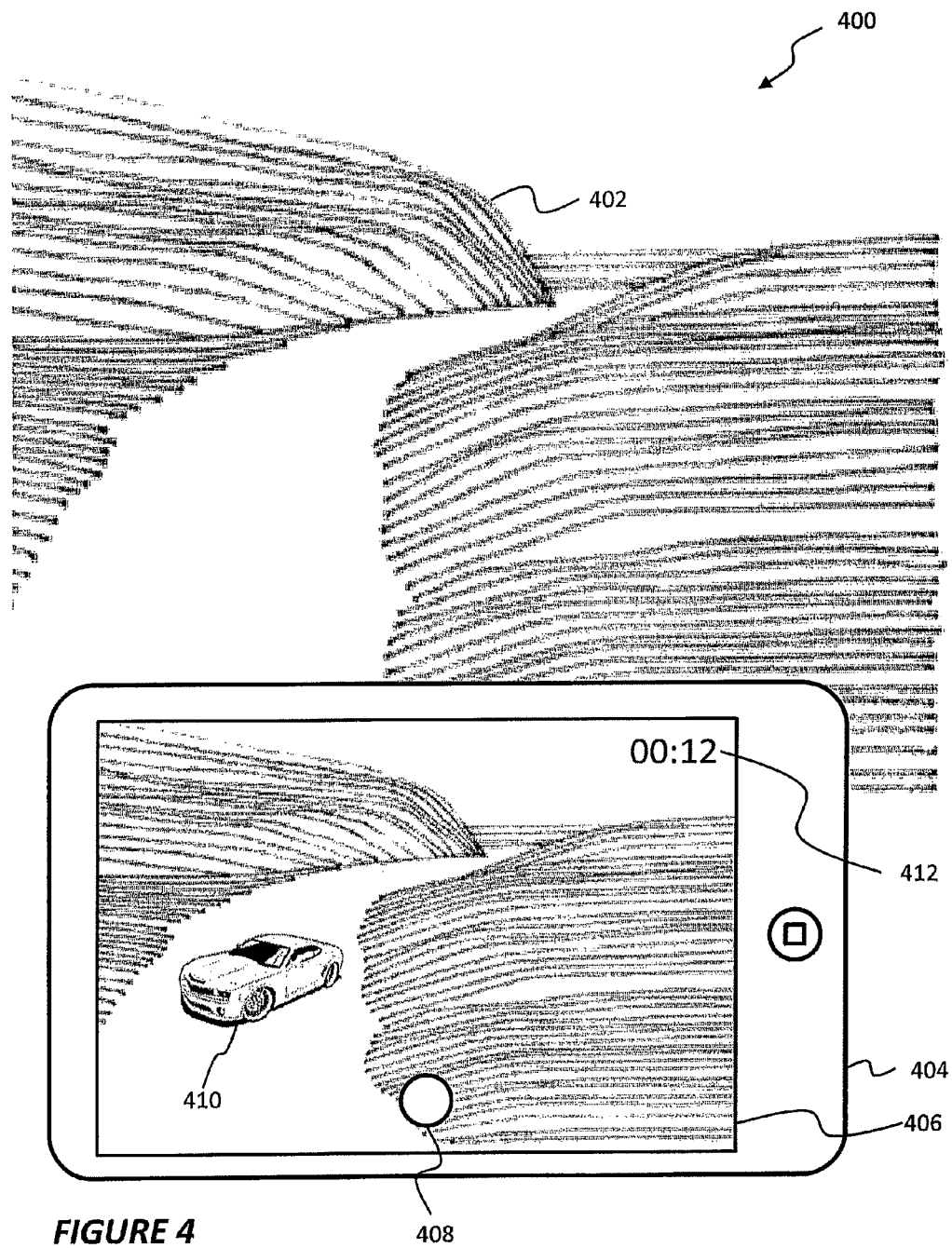
FIG. 4 is a representative example of a mobile electronic device having a recording capability and capturing a video image containing a landscape, with the post-processed video being displayed on the video display and having the embedded animation or graphic of a car positioned within the video.

Referring now to FIG. 4, a representative example of a mobile electronic device embodying the present invention is shown adjacent a field of view 400 containing landscape 402. Specifically, a mobile electronic device 404 includes a display 406 which is often also referred to as a viewfinder when the device is in the video capture mode. Display 406 may be equipped with a "recording" indicator 408 which, in some embodiments, may blink red as is customary in the industry. A chronometer, or time code, 412 may also be included in the display 406. Furthermore, recording indicator 408 may embody a countdown timer within the indicator, reflecting the duration of time recorded without requiring a view of the time code in 412.

In this example, device 404 has recorded a video within the field of view 400 and including landscape 402. The recorded video has been post-processed to include a motion graphic 410, which in this case resembles a vehicle such that the post-processed video now depicts the vehicle 410 being present in the landscape 402. Since this example is representative of the post-processed video, the previously shown virtual decal is not shown as it was replaced with vehicle motion graphic 410 through the processing of the recorded video.

Figure 5A:
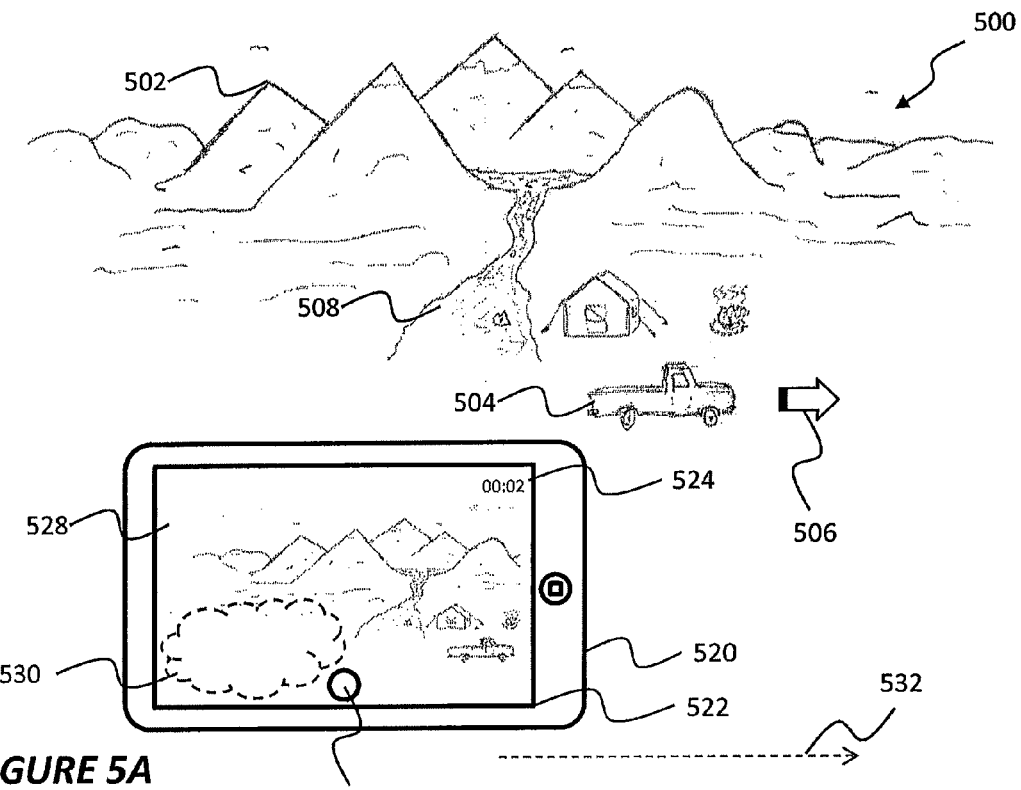
FIG. 5A is a representative example of the present invention embodied in a mobile electronic device as a landscape is being viewed and having a virtual decal resembling a "thought bubble" positioned in the lower left portion of the video display, or viewfinder, as the mobile electronic device is panned across the landscape.

Referring now to FIG. 5A, a representative example of the present invention embodied in a mobile electronic device is shown in a field of view 500 which includes a landscape 502 with moving elements, such as truck 504 moving in direction 506, and river 508. A mobile electronic device 520 includes a display 522, or viewfinder if in the recording mode, and having a recording indicator 526, reflecting through a countdown timer the same elapsed recording time as 524. As shown, viewfinder 522 is showing an image 528 of a portion of landscape 502 in field of view 500. Additionally, a virtual decal 530 resembling a "thought bubble" has been selected and positioned in the lower left portion of the video display 522, or viewfinder, as the mobile electronic device is panned across the landscape in direction 532.

It is to be understood that virtual decal 530 corresponds to a previously selected motion graphic and presented in a fashion that graphically identifies it as a virtual decal. For instance, virtual decal 530 can be represented by lines or shapes which are colored, dashed, etc. to distinguish the virtual decal 530 from the landscape image 528. In some cases, as in the "thought bubble" in FIG. 5A, the shape of virtual decal 530 resembles the motion graphic; however, this is not a requirement for the present invention.

Figure 5B:
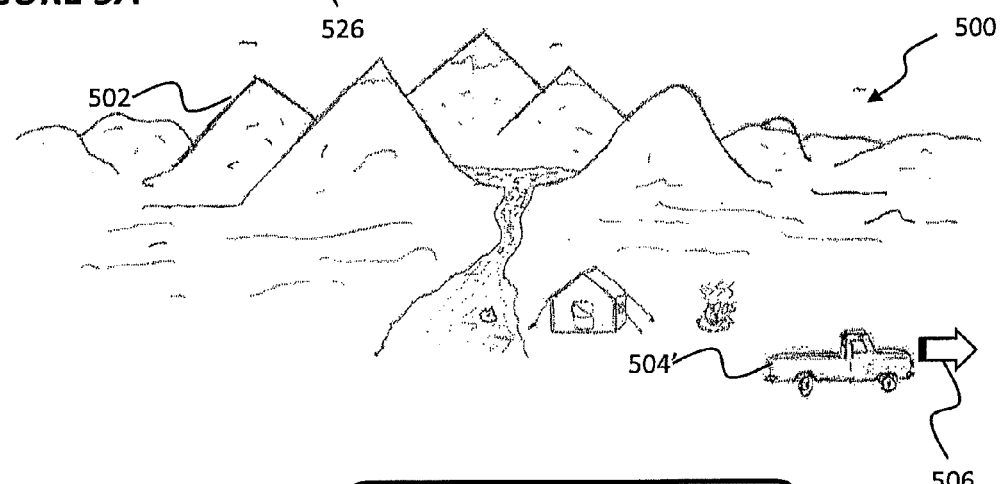
FIG. 5B is a representative example of the mobile electronic device shown in FIG. 5A displaying the post-processed video which has been enhanced with a motion graph in the location of the virtual decal, with the motion graphic changes yet is maintained in the same position of the video display as the remainder of the video image pans across the landscape

FIG. 5B is another representative example of the mobile device shown in FIG. 5A displaying the post-processed video 528 which has been enhanced with a motion graphic 534 in the prior location of the virtual decal 530 on display 522. The motion graphic 534 changes in accordance with the motion graphic selected, yet is maintained in the same position of the video display 522 as the remainder of the video image 528 pans across the landscape.

Figure 6:
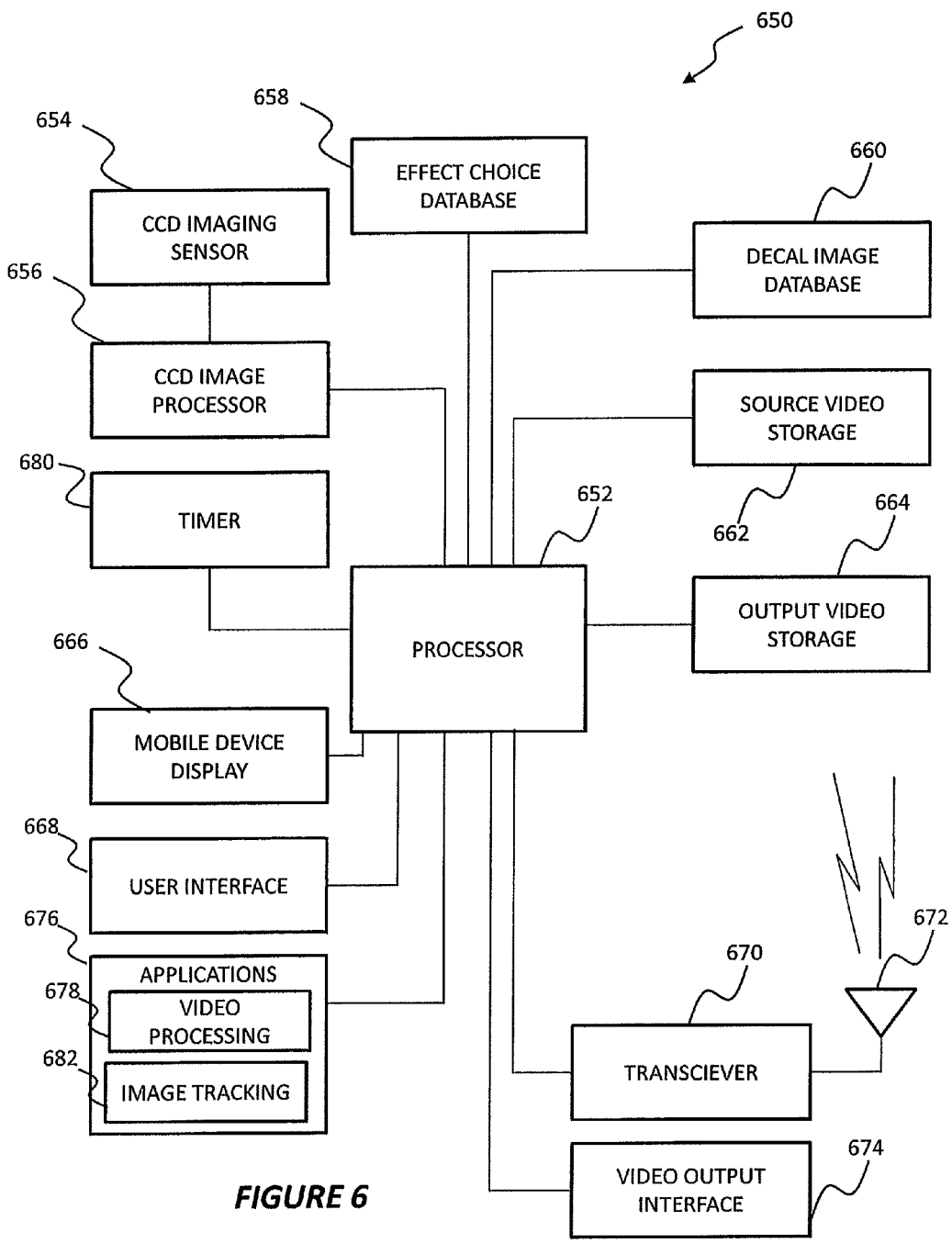
FIG. 6 is a representative block diagram of an exemplary mobile electronic device embodying the present invention, and includes a central processor which received image data from a Charge-Coupled-Device (CCD) Imaging Sensor that has been processed by a CCD Image Processor, a memory having an effect choice database, a memory having a virtual decal image database, an output video storage memory, and having a user interface with a display, and equipped with a radio frequency transceiver or video output interface.

Referring now to FIG. 6, a representative block diagram of an exemplary mobile computer embodying the present invention is shown and generally designated mobile computer 650. Mobile computer 650 may be employed as a mobile device for performing and/or enabling some or all of the actions described herein. Mobile Computer 650 includes a processor 652, such as a digital data processor, microprocessor, microcontroller, or programmable logic device known in the art and capable of completing the functions described herein. Central processor 622 receives image data from a Charge-Coupled-Device (CCD) Imaging Sensor 654 that has been processed by a CCD Image Processor 656. A memory 658 having an effect choice database provides a memory storage for video effects from which a user can select a desired motion graphic, which is provided directly to the processor 652. A memory 660 having a virtual decal image database provides a memory storage for virtual decals corresponding to the motion graphic. Also, an source video storage 662 and an output video storage 664 provides memory storage locations for video prior to incorporating the motion graphic, and post-processed once the motion graphic has been applied.

While device 650 has been shown to include multiple memory devices including effect choice database 658, virtual decal image database 660, source video storage 662, and output video storage 664, it is to be appreciated that the various memory can be combined into single memory devices having sufficient storage capacity and appropriate file indexing. Indeed, all memory functions may be incorporated into processor 652 without departing from the present invention.

Mobile Computer 650 may also include a mobile display device 666, such as a liquid crystal display (LCD) or equivalent known in the art, which serves as a viewfinder and video display, and may also include a user interface 668 which may include a keyboard, trackball, pressure or electrostatic sensitive membrane to perceive input from a user. Mobile Computer 650 may also include a radio frequency transceiver 670 or video output interface 674 to provide input to the device from other electronic devices, or to transmit post-processed video to other devices from antenna 672.

A timer 680 is provided to maintain timing information for the video graphic selected for use in the device of the present invention. Timer 680 may be programmed with a time entry corresponding to the effect choice selected from database 658, and provide the processor with updates once recording has begun to provide the user updates to minimum recording times necessary to fully embed the effect choice and video graphic in the recorded video.

In at least one of the various embodiments, although not shown, one or more motion sensors, such as, gyroscopes, accelerometers, may be included as part of mobile computer 650 for measuring and/or maintaining an orientation of mobile computer 650, and/or measuring the magnitude and/or direction of the acceleration of mobile computer 650.

Applications 676 may include computer executable instructions which, when executed by Mobile Computer 650, transmit, receive, and/or otherwise process instructions and data. Applications 676 may include, for example, Video Processing Application 678, and Image Tracking Application 682. In at least one of the various embodiments, Video Processing Application 678 may be arranged to process video that may be captured by CCD Imaging Sensor 654, including, embedding special effect graphics, embedding animations, displaying virtual decals, or the like. Image Tracking Application 682 may be arranged to determined tracking points and track there position between video frames.

Other examples of application programs that may be operative on Mobile Computer 650, include calendars, search programs, email client applications, IM applications, SMS applications, Voice Over Internet Protocol (VOIP) applications, contact managers, task managers, transcoders, database programs, word processing programs, security applications, spreadsheet programs, games, search programs, and so forth.

Figure 7:
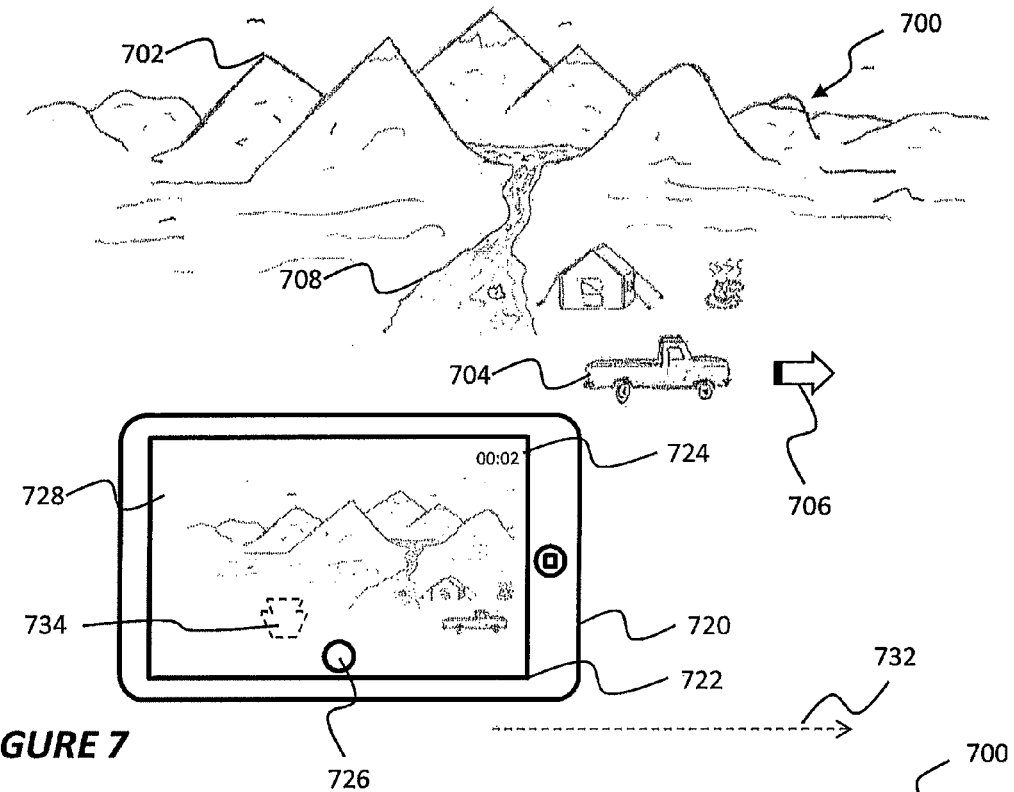
FIG. 7 is a representative example of the present invention embodied in a mobile electronic device as a landscape is being viewed through the viewfinder or display and showing a virtual decal corresponding to a motion graphic positioned on the screen providing visual guidance of the location of a to-be-applied motion graphic, and also contains an image of the landscape about to be video recorded as the device is panned across the landscape as the items in the landscape move in nature, such as the river flowing and the vehicle driving off.

Referring now to FIG. 7, a representative example of an alternative embodiment of the present invention embodied in a mobile electronic device is shown. A field of view 700 includes a landscape 702, as well moving elements, such as truck 704 moving in direction 706. Device 720 includes a viewfinder or display 722 having a chronometer 724, and a recording indicator 726.

In a recording mode as a landscape 702 is being viewed through the viewfinder or display 722, a virtual decal 734 corresponding to a motion graphic is positioned on the screen 722 providing visual guidance of the location of a to-be-applied motion graphic, and also contains an image 728 of the landscape being video recorded as the device is panned across the landscape in direction 732 as the items in the landscape move in nature, such as the river 708 flowing and the vehicle 704 driving off in direction 706. The virtual decal 734 corresponding to the selected motion graphic is fixed in the image 728 displayed on the viewfinder 722, and not fixed to a position on the viewfinder 722. Thus, when the device 720 pans across the landscape 702, the virtual decal 734 maintains its position in the video and translates across the display 722 corresponding to the translation of the image 728.

Button 726 initiates the recording of the video, and incorporates a countdown timer reflecting the duration of the motion graphic effect sequence. The video recorded is stored in memory and post-processed to insert the appropriate selected motion graphic into the video corresponding to the location of graphic 734.

Figure 7A:
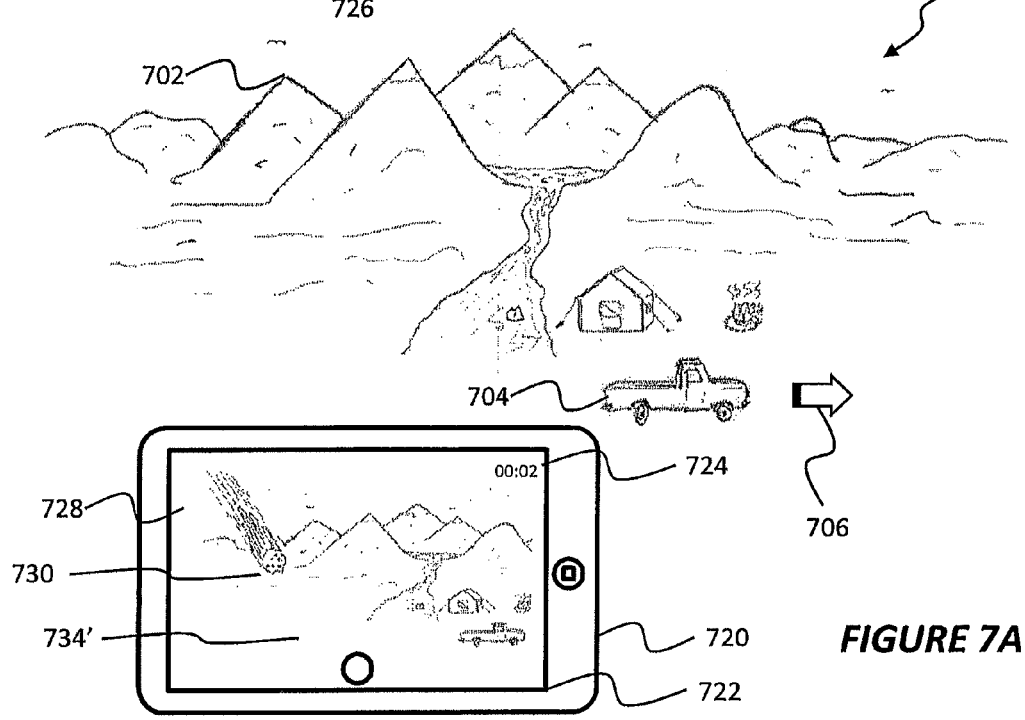
FIG. 7A is a representative example of the device of FIG. 7 showing the post-processed video containing a motion graphic resembling an incoming meteorite heading in the direction of the previously displayed virtual decal (shown in FIG. 7) and which trajectory remains stable relative to the landscape shown in the video despite the movement of the device as it pans from left to right across the landscape.

FIG. 7A is a representative example of the device of FIG. 7 showing an initial snapshot of the post-processed video containing a motion graphic 730 resembling an incoming meteorite heading toward the location 734' of the previously displayed virtual decal (not shown in this figure as it is not displayed in post-processed video). As the device 720 was panned during the recording of the video, the trajectory of the motion graphic 730 remains stable relative to the landscape 702 shown in the video despite the movement of the device 720 as it pans from left to right across the landscape.

Figure 7B:
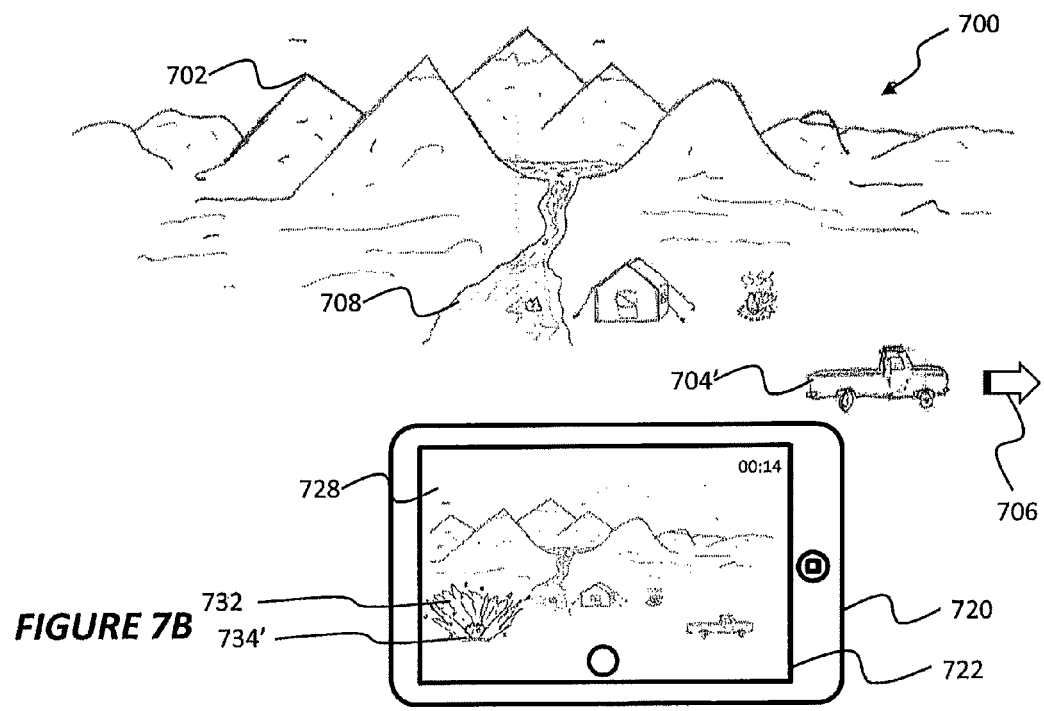
FIG. 7B is a representative example of the device of FIG. 7 showing the post-processed video containing the motion graphic now resembling a meteorite impacting the landscape in the location of the previously displayed virtual decal (shown in FIG. 7) while the location of the motion graphic remains stable relative to the landscape shown in the video despite the movement of the device as it continues to pan from left to right across the landscape.

FIG. 7B is a representative example of the device of FIG. 7 showing a subsequent snapshot of the post-processed video containing the motion graphic 732 now resembling a meteorite impacting the landscape in the location 734' of the previously displayed virtual decal 734 (shown in FIG. 7) while the location of the motion graphic 732 remains stable relative to the landscape 702 shown in the video despite the movement of the device 720 as it continues to pan from left to right across the landscape.

Figure 7C:
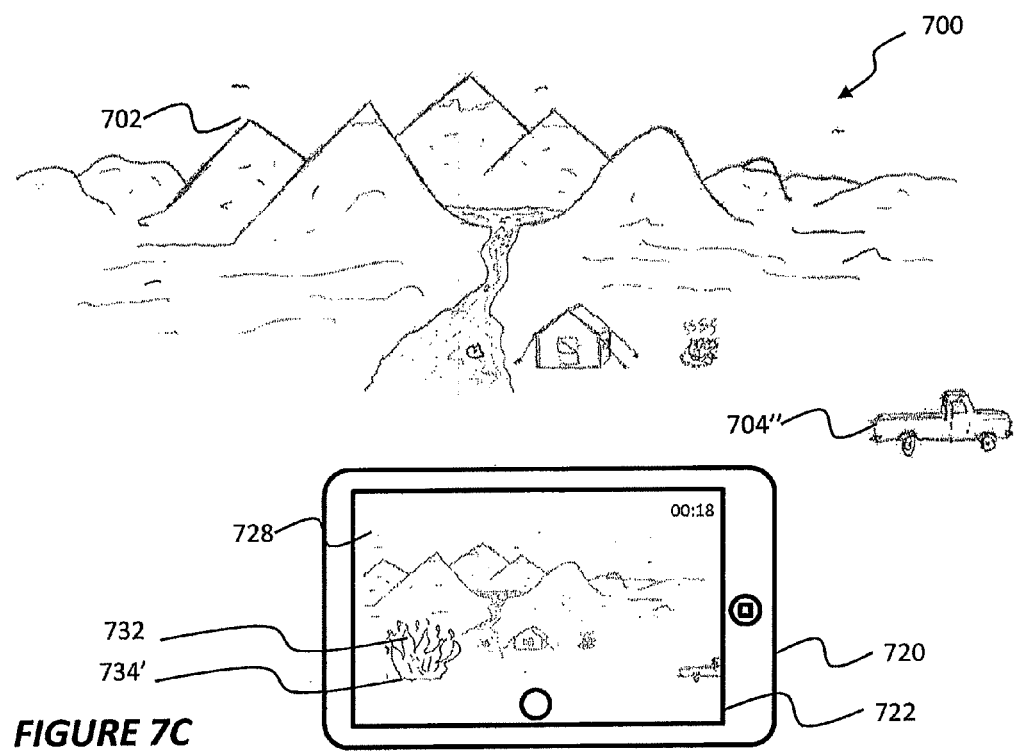
FIG. 7C is a representative example of the device of FIG. 7 showing the post-processed video containing the motion graphic now resembling a fire resulting from a meteorite impacting the landscape in the location of the previously displayed virtual decal (shown in FIG. 7) while the location of the motion graphic remains stable relative to the landscape shown in the video despite the movement of the device, and despite changes of items within the field of view, such as the truck driving away from the now-burning meteorite.

FIG. 7C is a representative example of the device of FIG. 7 showing the post-processed video containing the motion graphic 732 now resembling a fire resulting from a meteorite impacting the landscape 702 in the location 734' of the previously displayed virtual decal 734 (shown in FIG. 7). Again, the location 734' of the motion graphic 732 remains stable relative to the landscape 702 shown in the video despite the movement of the device 720, and despite changes of items within the field of view, such as the truck 704" driving away from the now-burning meteorite.

Figure 8:
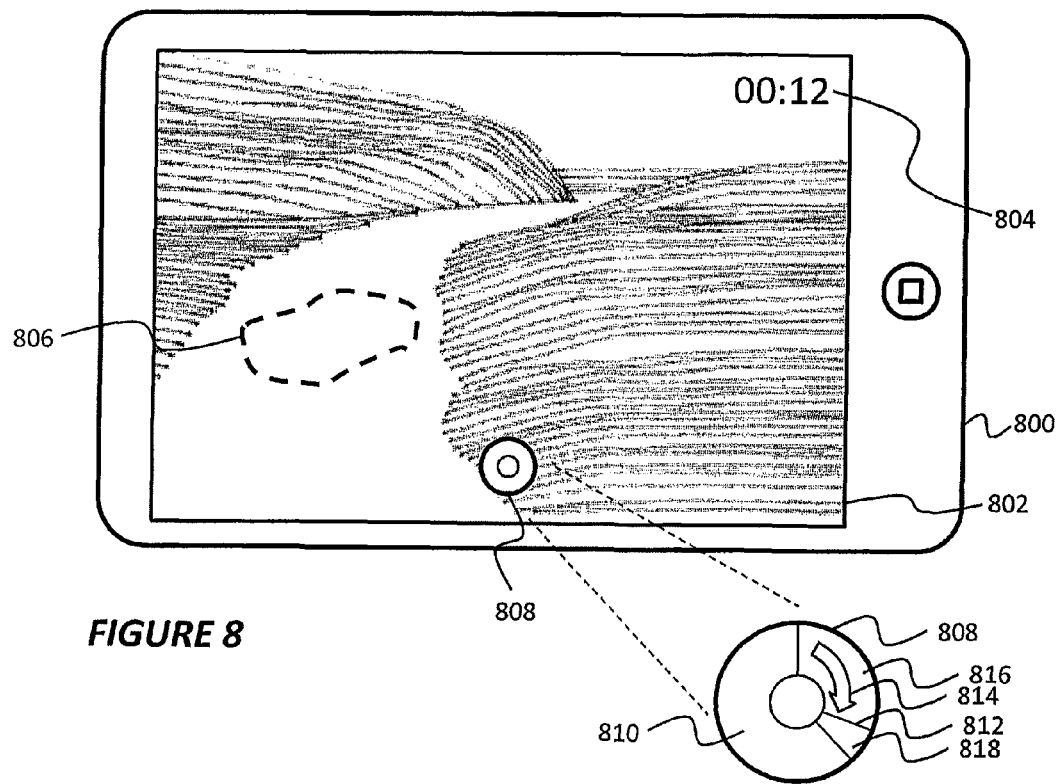
FIGS. 8 and 8A-8C are exemplary views of the device shown in FIG. 4 equipped with a recording capability and capturing a video image containing a landscape, and showing a recording button having a count-down timer which provides a user with a graphical representation of the time remaining corresponding to a specific motion graphic selected, with the recording button having a stopwatch arm rotating clockwise to zero with the portion representing the time used being of a first color or pattern, and the portion representing the time remaining being of a second color or pattern.

Referring now to FIG. 8 an exemplary view of an alternative embodiment of the device shown in FIG. 4 is generally designated 800. Device 800 is equipped with a display 802 and a video timer 804. The device is equipped with a recording capability and is capturing a video image containing a landscape. A virtual decal 806 is positioned in display 802 and represents the future position of a video graphic within the display 802 following post-processing of the captured video.

A recording button 808 includes an integral count-down timer. More specifically, referring to the enlarged view of the recording button 808, a graphical representation of the time remaining corresponding to a specific motion graphic selected is provided. At the beginning of a recording, timer 808 is entirely a first color 810. Once the recording begins, stopwatch arm 812 rotates in a clockwise direction 814 to zero with the portion representing the time used being of a first color or pattern 810, and the portion representing the time remaining being of a second color or pattern 816. A transition period 818 may be provided to give the user a warning of the upcoming end of the video graphic.

In order for the device and method of the present invention to perform optimally, any video recorded must at least last the duration of the motion graphic being embedded therein. To provide the user with a cue when the video is long enough, we created a countdown inside the recording button. The button is fully lit when recording is initiated, and gradually dims in a clockwise manner as the recording time elapses. When the video duration is long enough to incorporate the graphic, the button is fully dimmed. When the user presses the button, the recording stops and the button goes dark.

Another tool to assist a user in determining when a video is long enough to insert a video graphic is implemented in the virtual decal 806 itself. A visual cue notifies the user when sufficient video has been recorded to insert a specific video graphic. For instance, in one embodiment of the cue, virtual decal 806 is initially a first color. The color of the virtual decal changes from a first color, such as red, to a second color, such as green, when the elapsed video time is long enough to incorporate the motion graphic, thus making sure the video is long enough. This is particularly beneficial in circumstances when the user is focusing on the filming of a scene and not monitoring at the time directly.

Figure 8A:
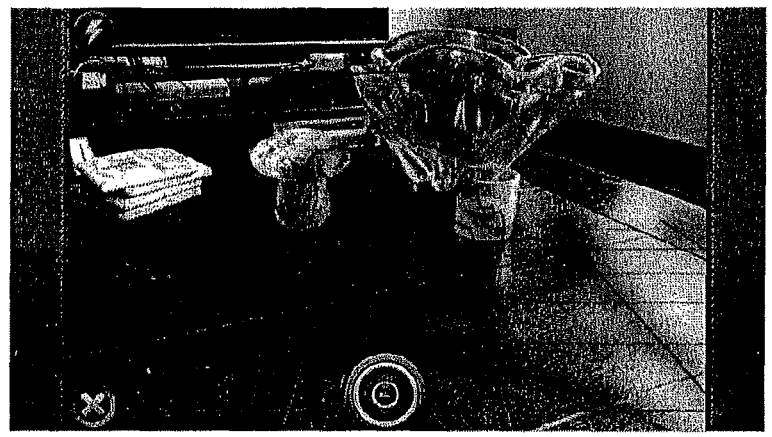
Figure 8B:
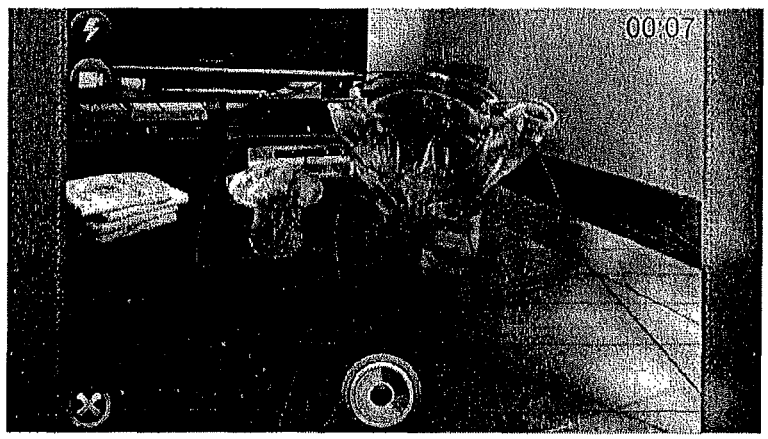
Figure 8C:

Referring to FIGS. 8A, 8B and 8C, the implementation of the features described are shown. In FIG. 8A, the recording button is completely red, a single color showing that the videotaping has not begun. Next in FIG. 8B, as the videotaping proceeds, the stopwatch arm rotates changing the previously red button, to a slightly lighter red color to signify the time period expired. Finally, in FIG. 8C, as the stopwatch arm has rotated completely, the ring of the recorder button is completely the second, lighter, color indicating that the minimum period for the video graphic has been achieved, and that the videotaping can now be stopped if desired. Also, in FIG. 8C, at the completion of the minimum period for the video graphic, the virtual decal has changed to a second color, such as green, to indicate that the minimum recording period has been achieved.

Referring now back to FIG. 2, method steps 226 through 230 are related to a visual timing cue that provides a user with feedback regarding the minimum video duration required for a particular video graphic. In step 226, a countdown timer is initialized to provide a timer such that the video being taken will be long enough to insert the chosen video graphic. During the recording, the virtual decal is maintained in the video scene in step 228.

If the timer has expired in step 230, the video recording may be ended in step 234, however, if the timer has not expired, return path 231 leads to step 232 in which the timer is decremented and the virtual decal timer effect is updated in step 233. The process returns to step 228 where the virtual decal is maintained, and again the timer is checked for expiration in step 230. This process continues until the timer reaches zero, and continues to update the virtual decal timer effect as described above to provide the user with information regarding the length of time the video must continue in order to make sure that the video graphic will fit within the post-processed video.

Figure 9:
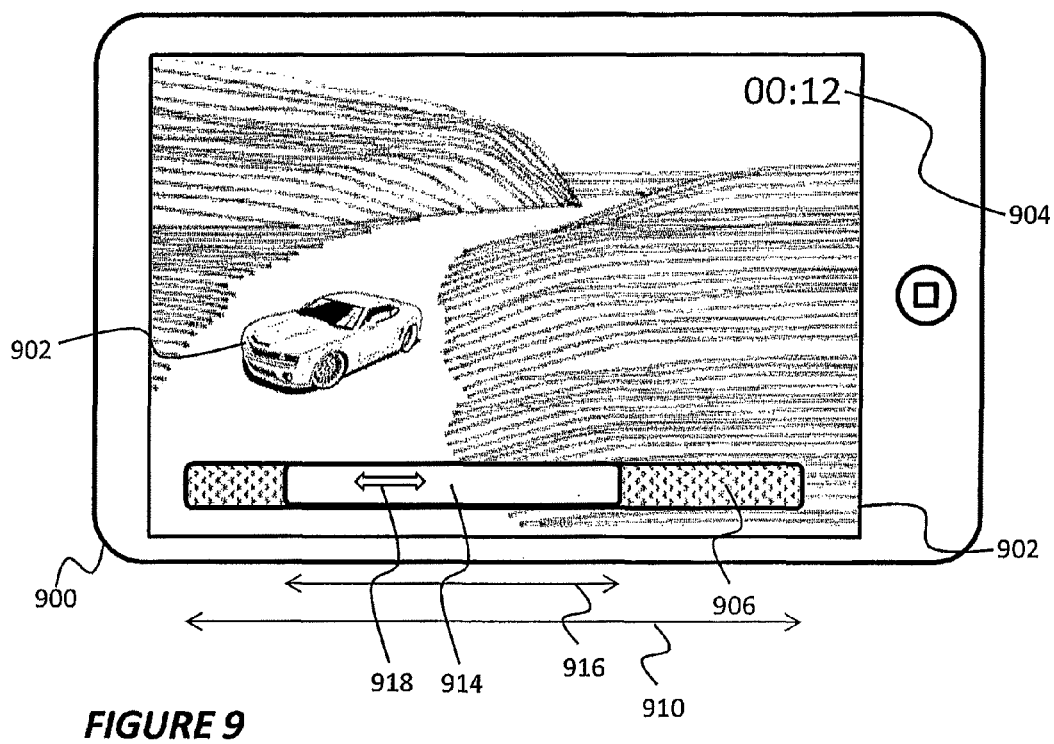
FIG. 9 is an exemplary view of the device shown in FIG. 8 displaying the post-processed video on the video display and having the embedded animation or graphic of a car positioned within the video, with a video timeline representing the entire period of the video to be processed, and having a sliding bar within the video timeline corresponding to the time period of the video graphic, which can be positioned along the timeline to provide for the selective placement of the video graph within the original video such that the video graphic will appear within the post-processed video at a specific point in the video.

FIG. 9 is an exemplary view of the device shown in FIG. 8, and generally designated 900. Device 900 includes a display 902 and a timer 904. This Figure depicts the device 900 displaying the post-processed video on the video display 902 and having the embedded animation or graphic of a car 905 positioned within the video, with a video timeline 906 representing the entire period 910 of the video to be processed. A sliding bar 914 within the video timeline 906 corresponds to the time period 916 of the video graphic. The sliding bar 914 may be positioned in direction 918 along the timeline to provide for the selective placement of the video graph within the original video such that the video graphic will appear within the post-processed video at a specific point in the video.

Figure 9A:
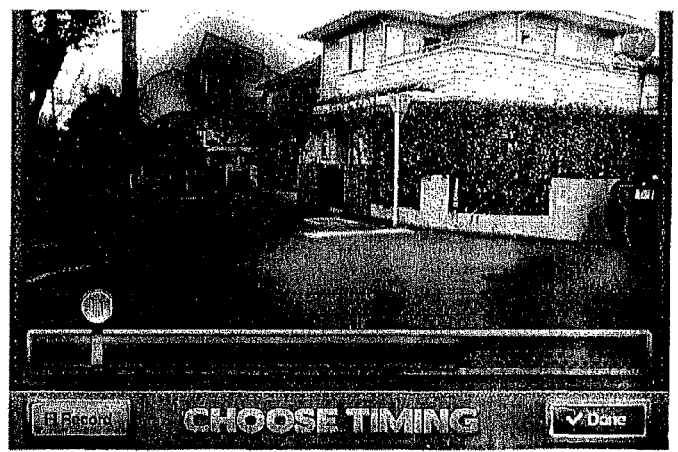
FIG. 9A is a photographic representation of the device of FIG. 9, showing an exemplary virtual decal on a display screen from a previously recorded video, and a sliding time scale showing the timeline of the video, and the shorter timeline of the video graph able to be slidably positioned within the video for post-processing.

Implementation of the above feature is depicted in FIG. 9A. In this Figure, a video is being prepared for post-processing, and the placement of the sliding bar within the timeline provides for insertion of the video graphic at precisely the desired moment in the post-processed video.

Figure 10A:
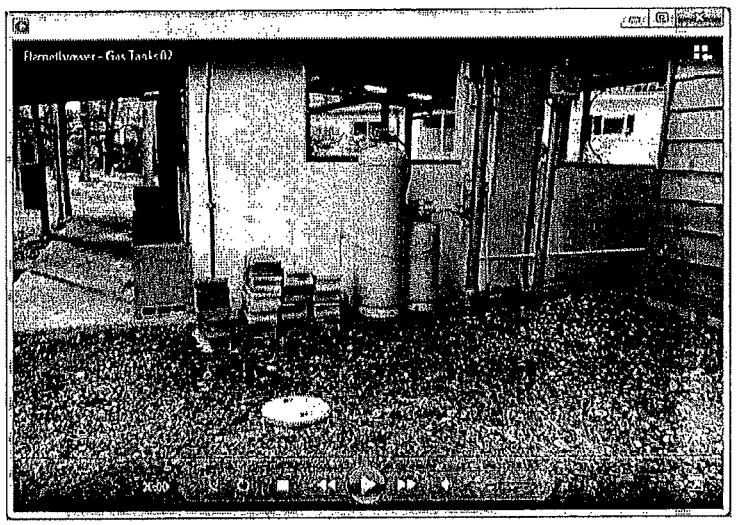
FIG. 10A through 10C are a series of screen-shots from a video having been created using the device of the present invention, including a video field of view which changes, and which is post-processed to include a video graphic resembling a flamethrower discharging a large volume of burning fuel towards a building.
Figure 10B:
Figure 10C:

Referring now to FIGS. 10A through 10C, a series of screen-shots from a video having been created using the device of the present invention are shown. FIG. 10A includes a video field of view which changes as the video recording device is moved while recording. A video was recorded and post-processed to include a video graphic resembling a flamethrower discharging a large volume of burning fuel towards a building in FIG. 10B. In FIG. 10C, the scene nears completion as the flamethrower is removed, and the remaining burning fuel continues in the scene.

It is to be appreciated from these Figures that a rather mundane video tape showing the outside of a building may be augmented using the present invention to include a video graphic which provides an artistic and creative element to the video. It is fully contemplated in this invention that the video graphic can depict virtually anything, from moving vehicles, flamethrowers, to wandering wildlife, alien life forms and whatever else can be imagined.

Figure 11:
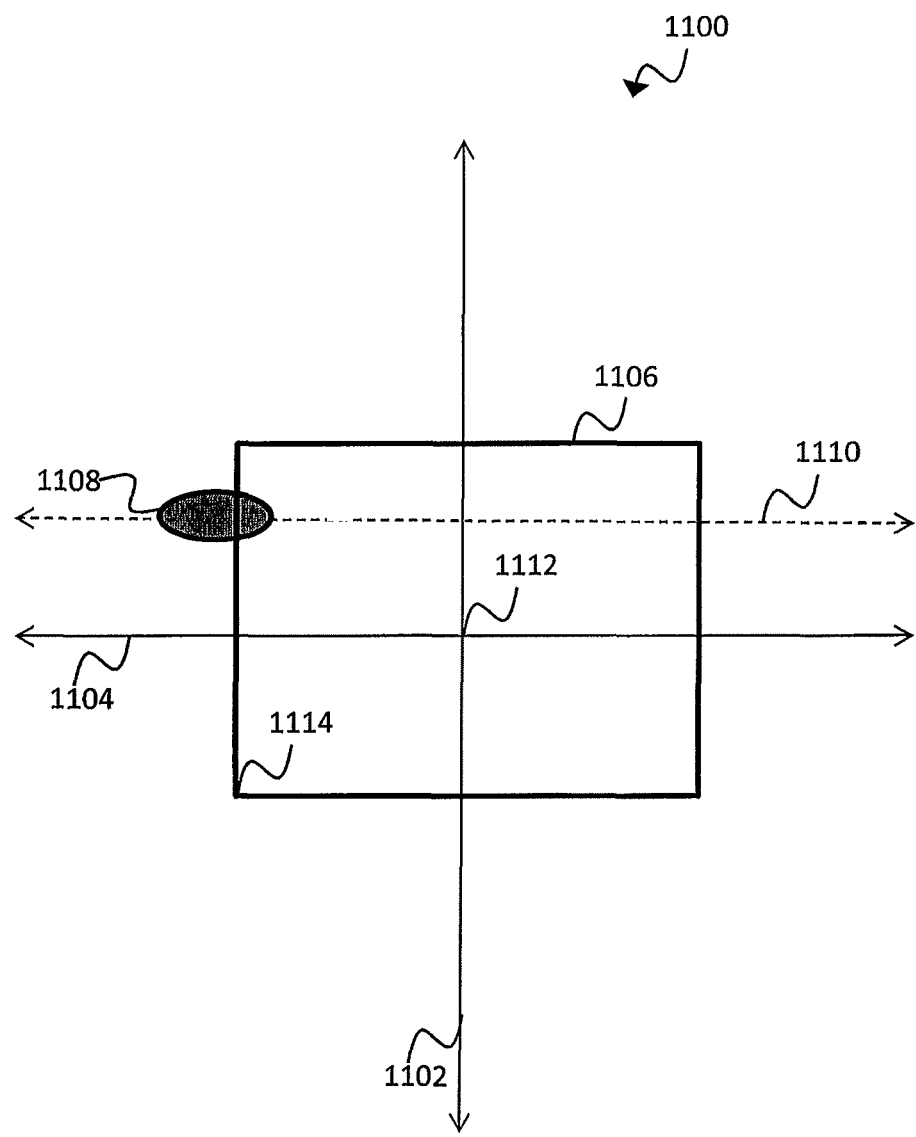
FIG. 11 illustrates maintaining multiple coordinates systems for tracking the motion graphic, in accordance with at least one of the various embodiments.

FIG. 11 illustrates system 1100 for maintaining multiple coordinate systems for tracking the motion graphic, in accordance with at least one of the various embodiments. As discussed above, image tracking application 682 may be arranged to include at least two coordinate systems. Y-axis 1102 and x-axis 1104 may be the y and x axis for a motion coordinate system that may be larger than image frame 1106. Motion graphic 1108 may be determined to be progressing through the scene along tracking path 1110. Further, origin 1112 may be the origin of the motion coordinate system.

In at least one of the various embodiments, a frame coordinate system based on image frame 1106 may have an origin represented by origin 1114. Accordingly, x-axis for the frame coordinate system may be the lower boundary of image frame 1106 extending from origin 1114 to the right. And, the y-axis for the frame coordinate system may be left boundary of image 1106 extending from origin 1114 upwards.

In at least one of the various embodiments, motion graphic 1108 may be tracked in terms of the motion coordinate system (e.g., using points defined by x-axis 1104 and y-axis 1102). If video processing application 678 embeds motion graphic 1108 into image frame 1106 for the final scene, the location of pixels/vectors comprising motion graphic 1108 may be scaled, translated, and otherwise transformed from the motion coordinate system to the frame coordinate system for image frame 1106.

In at least one of the various embodiments, since at certain times motion graphic 1108 may be entirely or partially out of the image frame and thus outside the bounds of the frame coordinate system, portions of the motion graphic determined to be outside of the frame coordinate system may be excluded from the processing required to embed the motion graphic into the final scene. It will be understood that each block and/or step of the flowchart illustrations, and combinations of blocks and/or steps in the flowchart illustrations, can be implemented by computer program instructions. These program instructions may be provided to a processor to produce a machine, such that the instructions, which execute on the processor, create means for implementing the actions specified in the flowchart block/step or blocks/steps. The computer program instructions may be executed by a processor to cause a series of operational steps to be performed by the processor to produce a computer-implemented process such that the instructions, which execute on the processor to provide operations for implementing the actions specified in the flowchart block/step or blocks/steps. The computer program instructions may also cause at least some of the operational steps shown in the blocks of the flowchart to be performed in parallel. Moreover, some of the steps may also be performed across more than one processor, such as might arise in a multi-processor computer system. In addition, one or more blocks or combinations of blocks in the flowchart illustration may also be performed concurrently with other blocks or combinations of blocks, or even in a different sequence than illustrated without departing from the scope or spirit of the invention.

Accordingly, blocks/steps of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems, which perform the specified actions or steps, or combinations of special purpose hardware and computer instructions. The foregoing example should not be construed as limiting and/or exhaustive, but rather, an illustrative use case to show an implementation of at least one of the various embodiments of the invention.

What is claimed as new and desired to be protected by Letters Patent of the United States is:

1. A method for video processing using a mobile computer, comprising:
    selecting a motion graphic for displaying at a location in a video scene;
    employing a view finder provided by the mobile computer to view the video scene while positioning a virtual decal at the location in the video scene, wherein the virtual decal represents the selected motion graphic;
    employing the mobile computer to capture a sequence of video frames of the video scene while at least a portion of the virtual decal is viewable in the video scene with the view finder; and
    iteratively processing each recorded video frame from the sequence of captured video frames using the mobile computer, wherein the processing includes:
        determining a plurality of tracking points within each video frame based on at least one characteristic of an image included in the video frame;
        determining a quality score for each of the tracking points;
        if the quality score corresponding to an individual tracking point included in the plurality of tracking points is less than a defined threshold, discarding the individual tracking point from the plurality of tracking points;
        determining at least one reference point within the video frame based on at least the location of a portion of the plurality of determined tracking points; and
        embedding the motion graphic in the video frame at the location of the virtual decal, wherein the motion graphic is further positioned in the video frame based at least on the reference point.

2. The method of claim 1, further comprising, if a quantity of tracking points included in the plurality of tracking points drops below a threshold, determine another plurality of tracking points from a next video frame.

3. The method of claim 1, wherein determining the quality score for each of the tracking points, further comprises, determining an age of the tracking point and the variance between its predicted location and its actual location within each video frame.

4. The method of claim 1, wherein capturing the sequence of video frames of the video scene using the mobile computer, further comprises, displaying a visual timing cue in the mobile computer's view finder that indicates a duration for playing back the motion graphic.

5. The method of claim 1, wherein displaying the virtual decal in the video scene, further comprises, modifying a location of the virtual decal within the view finder based on at least one dynamic property of the motion graphic.

6. The method of claim 1, further comprising, enabling a user to adjust a size of the virtual decal for determining a size of the motion graphic for embedding in each of the video frames.

7. The method claim 1, wherein determining a plurality of tracking points within the video frame, further comprises, computing a score based on at least one of contrast, brightness, darkness, pattern matching, edge detection, or corner-recognition.

8. The method of claim 1, further comprising, plotting a position of the motion graphic using a coordinate system that is separate from another coordinate system that corresponds to each video frame.

9. A mobile computer for video processing, comprising:
    a transceiver for communicating over the network;
    a memory for storing at least instructions;
    a processor device that is operative to execute instructions that enable actions, including:
        selecting a motion graphic for displaying at a location in a video scene;
        employing a view finder provided by the mobile computer to view the video scene while positioning a virtual decal at the location in the video scene, wherein the virtual decal represents the selected motion graphic;
        employing the mobile computer to capture a sequence of video frames of the video scene while at least a portion of the virtual decal is viewable in the video scene with the view finder; and
        iteratively processing each recorded video frame from the sequence of captured video frames using the mobile computer, wherein the processing includes:
            determining a plurality of tracking points within each video frame based on at least one characteristic of an image included in the video frame;
            determining a quality score for each of the tracking points;
            if the quality score corresponding to an individual tracking point included in the plurality of tracking points is less than a defined threshold, discarding the individual tracking point from the plurality of tracking points;
            determining at least one reference point within the video frame based on at least the location of a portion of the plurality of determined tracking points; and
            embedding the motion graphic in the video frame at the location of the virtual decal, wherein the motion graphic is further positioned in the video frame based at least on the reference point.

10. The mobile computer of claim 9, further comprising, if a quantity of tracking points included in the plurality of tracking points drops below a threshold, determine another plurality of tracking points from a next video frame.

11. The mobile computer of claim 9, wherein determining the quality score for each of the tracking points, further comprises, determining an age of the tracking point and the variance between its predicted location and its actual location within each video frame.

12. The mobile computer of claim 9, wherein capturing the sequence of video frames of the video scene using the mobile computer, further comprises, displaying a visual timing cue in the mobile computer's view finder that indicates a duration for playing back the motion graphic.

13. The mobile computer of claim 9, wherein displaying the virtual decal in the video scene, further comprises, modifying a location of the virtual decal within the view finder based on at least one dynamic property of the motion graphic.

14. The mobile computer of claim 9, further comprising, enabling a user to adjust a size of the virtual decal for determining a size of the motion graphic for embedding in each of the video frames.

15. The mobile computer of claim 9, wherein determining a plurality of tracking points within the video frame, further comprises, computing a score based on at least one of contrast, brightness, darkness, pattern matching, edge detection, or corner-recognition.

16. The mobile computer of claim 9, further comprising, plotting a position of the motion graphic using a coordinate system that is separate from another coordinate system that corresponds to each video frame.

17. A processor readable non-transitory storage media that includes instructions for video processing using a mobile computer, wherein the mobile computer that executes at least a portion of the instructions enables actions, comprising:
   selecting a motion graphic for displaying at a location in a video scene;
   employing a view finder provided by the mobile computer to view the video scene while positioning a virtual decal at the location in the video scene, wherein the virtual decal represents the selected motion graphic;
   employing the mobile computer to capture a sequence of video frames of the video scene while at least a portion of the virtual decal is viewable in the video scene with the view finder; and
   iteratively processing each recorded video frame from the sequence of captured video frames using the mobile computer, wherein the processing includes:
      determining a plurality of tracking points within each video frame based on at least one characteristic of an image included in the video frame;
      determining a quality score for each of the tracking points; if the quality score corresponding to an individual tracking point included in the plurality of tracking points is less than a defined threshold, discarding the individual tracking point from the plurality of tracking points;
      determining at least one reference point within the video frame based on at least the location of a portion of the plurality of determined tracking points; and
      embedding the motion graphic in the video frame at the location of the virtual decal, wherein the motion graphic is further positioned in the video frame based at least on the reference point.

18. The media of claim 17, further comprising, if a quantity of tracking points included in the plurality of tracking points drops below a threshold, determine another plurality of tracking points from a next video frame.

19. The media of claim 17, wherein determining the quality score for each of the tracking points, further comprises, determining an age of the tracking point and the variance between its predicted location and its actual location within each video frame.

20. The media of claim 17, wherein capturing the sequence of video frames of the video scene using the mobile computer, further comprises, displaying a visual timing cue in the mobile computer's view finder that indicates a duration for playing back the motion graphic.

21. The media of claim 17, wherein displaying the virtual decal in the video scene, further comprises, modifying a location of the virtual decal within the view finder based on at least one dynamic property of the motion graphic.

22. The media of claim 17, further comprising, enabling a user to adjust a size of the virtual decal for determining a size of the motion graphic for embedding in each of the video frames.

23. The media of claim 17, wherein determining a plurality of tracking points within the video frame, further comprises, computing a score based on at least one of contrast, brightness, darkness, pattern matching, edge detection, or corner-recognition.

24. The media of claim 17, further comprising, plotting a position of the motion graphic using a coordinate system that is separate from another coordinate system that corresponds to each video frame.

* * * * *